Aug. 30, 1927.

J. F. P. COSTE 1,640,349

RESILIENT WHEEL FOR VEHICLES

Original Filed Aug. 30, 1922

Inventor:
Jean F. P. Coste
by
Stockbridge & Borst
Attys.

Patented Aug. 30, 1927.

1,640,349

UNITED STATES PATENT OFFICE.

JEAN FRANÇOIS PASCAL COSTE, OF BILLANCOURT, FRANCE.

RESILIENT WHEEL FOR VEHICLES.

Original application filed August 30, 1922, Serial No. 585,179, and in France November 19, 1921. Divided and this application filed September 18, 1926. Serial No. 136,249.

This invention relates to wheels for motor vehicles and has for its object a construction of wheel which will give a good suspension to all the various parts of the vehicle without the necessity of adding special extra suspension means to the body of the vehicle itself, or to the axles or other parts. The provision of such a suspension will prevent the violent shocks usually experienced on bad roads,—a possible cause of breakages having serious consequences—thus increasing the co-efficient of safety and the general comfort of persons using the vehicle. The tractive effect on the wheels is also improved by the invention.

In carrying the invention into effect I provide a wheel comprising a central disc, with an outer disc on each side thereof and concentric therewith. The central disc and each of the two outer discs are each provided with recesses, the recesses in the said central disc being concentric with the corresponding recesses in the outer discs. Within each recess in the central disc is fitted a leaf spring of such width that its lateral edges abut against the walls of the corresponding recesses in the outer discs. The central disc is thus free to move in its own plane against the pressure of the springs and means are provided when necessary to prevent relative angular movement of the central disc and the outer discs under tractive effort or breaking.

This application is a division of my corresponding application S. N°. 585,179, filed August 30, 1922, and patented October 19, 1926, No. 1,603,453 and covering a similar resilient wheel for vehicles, having a different sort of spring elements.

The invention will now be fully described with reference to the accompanying drawings, wherein.

Figure 1:
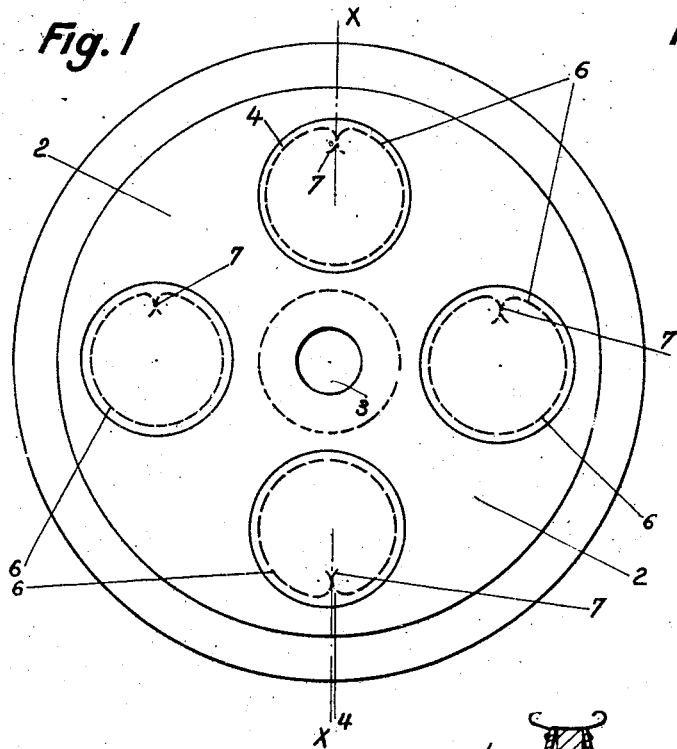
Fig. 1 is a side view of a wheel constructed according to the invention.
Figure 2:
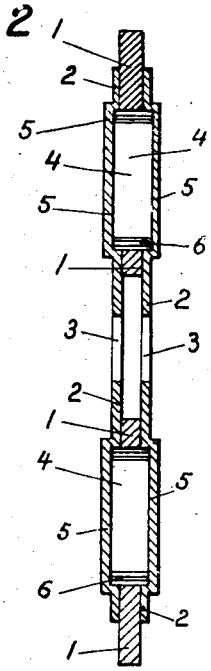
Figure 2 is a cross section on the line X—X of Figure 1.
Figure 3:
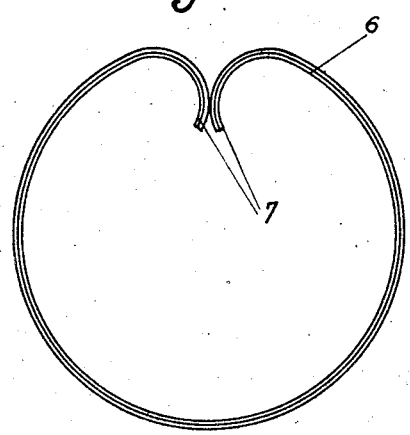
Figure 3 is a view in side elevation of the form of spring means which is employed within the wheel.
Figure 4:
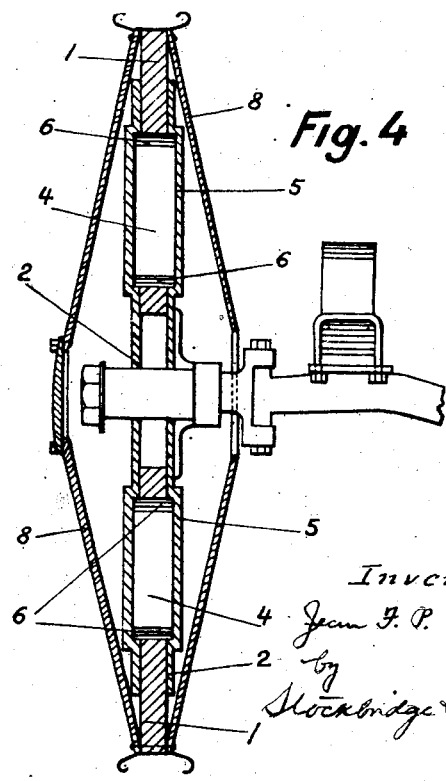
Figure 4 is a central cross section of a wheel constructed according to the invention and provided with a mud and dustproof casing fitted thereto.

In the illustrated embodiment of the invention a flat disc 1 of suitable material such as wood, fibre or metal is adapted to receive the rim of a tire of any type and is disposed between two discs or flitch plates 2 which are of less diameter than the disc 1 which constitutes the rim of the wheel. The two outer discs 2 are placed one on each side of the rim disc 1 and concentric therewith. The discs 2 are provided with a central bore 3 by means of which they may be fitted upon the wheel axle with the axle bearing of any suitable or convenient form such as illustrated in Fig. 4. The rim disc 1 is provided with a central aperture or bore concentric with the bore 3 but considerably greater in diameter so that the rim disc 1 may have movement in its plane between the discs 2 to a limited extent without engaging with the axle which passes through the bores 3.

The rim disc 1 is also provided with a plurality of circular apertures 4 arranged eccentrically around the axle bores 3 of the discs 2, and said discs 2 are provided upon their inner faces with circular recesses or depressions 5 which are concentric with, and equal in diameter to the apertures 4 of the rim disc. A split looped, preferably longitudinally laminated, spring element 6 is disposed in each aperture 4 of the rim disc so as to fit snugly around the peripheral wall thereof, and of greater width than the thickness of the rim disc at the apertures so as to extend to each side of the rim disc into the recesses 5 of the outer discs 2 which are aligned with the apertures 4. With this construction, it will be observed that the split spring elements 6 will yieldingly resist movement of the rim disc in its plane, relatively to the outer discs 2, and consequently the spring elements will yieldingly resist radial movement of the rim disc by reason of pressure applied thereto at any point of its periphery. The spring elements 6 also provide a rotary traction connection between the discs 2 and the rim disc 1 to insure their rotation together without preventing the radial movement of the rim disc.

The spring elements 6 at their abutting ends are turned arcuately inwards as in 7 so as to directly abut with one another.

When the vehicle provided with wheels of this type travels over any kind of ground, the shocks or vibrations which are imparted to the rim discs of the wheels by the unevenness of the ground will be largely taken up or absorbed by the split spring elements 6 and will not be communicated to the vehicle axles. At the same time the split spring elements insure rotation of the wheel with the rim disc.

The wheel proper, may, if desired, be provided with a dished cover 8 as shown in Figure 4 on one or both sides thereof, to protect the component parts of the wheel from dust and mud.

Having now particularly described and ascertained the nature of the invention and the manner of its performance, I declare that what I claim is:

1. A resilient wheel for vehicles, comprising a shell, a rim member located without and extending into said shell with apertures in the portion within the shell, said shell having pockets substantially concentric with the apertures in the rim member and of a depth between opposite faces of the shell greater than the thickness of the rim member at the apertures, a longitudinally laminated split looped spring contained in each pocket and the respective concentric aperture of the rim member for yieldingly resisting radial movement of the latter relatively to the shell, the ends of the split spring being turned inwardly at their abutting ends.

2. A resilient wheel for vehicles, comprising a pair of parallel spaced concentric discs, each having depressions with arcuate side walls in its inner face, the depressions being arranged eccentrically of the discs and aligned in pairs, whereby each pair form an internal pocket, a rim member disposed between the discs so as to extend outwardly around the periphery thereof, said member having therein apertures aligned with and equal in size to the depressions, and a longitudinally laminated split looped spring element with inwardly turned abutting ends, disposed in each aperture of the rim member so as to extend edgewise into both of the depressions of the discs which are aligned therewith, whereby the spring elements will yieldingly resist radial movement of the rim member relatively to the discs.

3. In a resilient wheel for vehicles, two overlapping abutting members relatively movable in their respective planes, said members having a pair of aligned recesses with arcuate lateral walls when they are in one relative position, and a longitudinal laminated split looped spring element with inwardly turned abutting ends, disposed jointly in the aligned recesses so as to extend closely around the lateral walls of both recesses, whereby the split element will yieldingly resist the relative movements of the members.

4. A resilient wheel for vehicles, comprising a pair of parallel spaced concentric discs, each having depressions with arcuate side walls in its inner face, the depressions being arranged eccentrically of the discs and aligned in pairs, whereby each pair forms an internal pocket, a rim member disposed between the discs so as to extend outwardly around the periphery thereof, said member having therein apertures aligned with and equal in diameter to the depressions, and an element disposed in each aperture, said element consisting of a spring bent into a loop with its ends free and turned in toward the center of the loop, and said element extending sidewise into both the depressions of the discs which are aligned with the aperture, whereby the spring elements will yieldingly resist radial movement of the rim member relatively to the discs, whereby said elements may flex inwardly of said loop, and whereby the loop ends in contacting under pressure may meet on their exterior sides and fold on each other with rolling or sliding contact without breaking.

In testimony whereof I affix my signature.

JEAN FRANÇOIS PASCAL COSTE.